US010345331B2

(12) United States Patent
Tanabe et al.

(10) Patent No.: US 10,345,331 B2
(45) Date of Patent: Jul. 9, 2019

(54) MOBILE ELECTRONIC DEVICE, CONTROL METHOD AND NON-TRANSITORY STORAGE MEDIUM THAT STORES CONTROL PROGRAM (71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP)

(73) Assignee: KYOCERA CORPORATION, Kyoto (JP)

(*) Notice: Subject to any disclaimer, the term of this patent is extended or adjusted under 35 U.S.C. 154(b) by 150 days.

(21) Appl. No.: 15/506,618

(22) PCT Filed: Aug. 13, 2015

(86) PCT No.: PCT/JP2015/072900
§ 371 (c)(1),
(2) Date: Feb. 24, 2017

(87) PCT Pub. No.: WO2016/031583
PCT Pub. Date: Mar. 3, 2016

(65) Prior Publication Data
US 2017/0254829 A1    Sep. 7, 2017

(30) Foreign Application Priority Data
Aug. 27, 2014  (JP) .................. 2014-172723

(51) Int. Cl.
G06F 1/24      (2006.01)
G06F 9/00      (2006.01)
(Continued)

(52) U.S. Cl.
CPC ............ *G01P 15/105* (2013.01); *G01C 21/26* (2013.01); *H04M 1/00* (2013.01);
(Continued)

(58) Field of Classification Search
CPC . G01P 15/105; H04M 19/04; H04M 1/72569; H04M 1/72563; H04M 1/00; H04M 2250/12; G01C 21/26
See application file for complete search history.

(56) References Cited

U.S. PATENT DOCUMENTS 8,862,427 B2    10/2014  Sakuraoka
2010/0304754 A1  12/2010  Czompo et al.
(Continued)

FOREIGN PATENT DOCUMENTS

JP    2004-312439 A    11/2004
JP    2011-257374 A    12/2011
JP    2014-27475 A      2/2014

OTHER PUBLICATIONS

Extended European Search Report in EP Application No. 15836826.6, dated Jan. 29, 2018, 9pp.
(Continued)

Primary Examiner — Xuxing Chen
(74) Attorney, Agent, or Firm — Hauptman Ham, LLP (57) ABSTRACT In one of aspects, a mobile electronic device that is configured to determine transportation thereof comprises at least one controller that is configured to, while a predetermined vibration is being detected, determine that the transportation is a train when a predetermined change in magnetic field strength is detected within a predetermined period of time. On the other hand, the at least one controller is configured to determine that the transportation is an automobile when the predetermined change in the magnetic field strength is not detected within the predetermined period of time. The at least one controller is further configured to determine that, when predetermined information regarding rotation of the mobile electronic device is detected, the transportation is an automobile even when the predetermined change in the
(Continued)

magnetic field strength has been detected within the predetermined period of time.

6 Claims, 3 Drawing Sheets

(51) Int. Cl.
    *G01P 15/105*     (2006.01)
    *G01C 21/26*     (2006.01)
    *H04M 1/00*     (2006.01)
    *H04M 1/725*     (2006.01)
    *H04M 19/04*     (2006.01)

(52) U.S. Cl.
    CPC ... *H04M 1/72563* (2013.01); *H04M 1/72569* (2013.01); *H04M 19/04* (2013.01); *H04M 2250/12* (2013.01)

(56) References Cited

U.S. PATENT DOCUMENTS

| | | |
|---|---|---|
| 2011/0282620 A1 | 11/2011 | Sakuraoka |
| 2013/0179107 A1 | 7/2013 | Setoguchi et al. |
| 2014/0082952 A1 | 3/2014 | Fujiwara |

OTHER PUBLICATIONS

International Search Report in PCT/JP2015/072900, dated Nov. 2, 2015.

Satoyuki Uehara et al., "A Study on Geomagnetic Sensor Data in a Mobile Phone for an Estimation of Person Mobility Means", IEICE Technical Report, May 12, 2011, pp. 33 to 38, vol. 111, No. 50.

MOBILE ELECTRONIC DEVICE, CONTROL METHOD AND NON-TRANSITORY STORAGE MEDIUM THAT STORES CONTROL PROGRAM

CROSS-REFERENCE TO RELATED APPLICATION

This application is a national stage of PCT International Application No. PCT/JP2015/072900 filed in Japan on Aug. 13, 2015, which claims priority to Japanese Patent Application No. 2014-172723 filed in Japan on Aug. 27, 2014.

FIELD

The present application relates to a mobile electronic device, a control method, and a non-transitory storage medium that stores a control program.

BACKGROUND

Regarding a mobile electronic device such as a mobile phone and a smartphone, there is a conventional technique for determining transportation thereof using an acceleration sensor mounted thereon (see JP 2011-257374 A).

SUMMARY

A mobile electronic device, a control method, and a non-transitory storage medium that stores a control program are disclosed.

According to one aspect, there is provided a mobile electronic device configured to determine transportation thereof, the mobile electronic device comprising: at least one controller that is configured to, while a predetermined vibration is being detected, determine that the transportation is a train when a predetermined change in magnetic field strength is detected within a predetermined period of time, and determines that the transportation is an automobile when the predetermined change in the magnetic field strength is not detected within the predetermined period of time, wherein, when predetermined information regarding rotation of the mobile electronic device is detected, the at least one controller is further configured to determine that the transportation is an automobile even when the predetermined change in the magnetic field strength has been detected within the predetermined period of time.

According to one aspect, there is provided a mobile electronic device configured to determine transportation thereof, the mobile electronic device comprising: at least one controller that is configured to, while a predetermined vibration is being detected, determine that the transportation is an automobile based on predetermined information regarding rotation of the mobile electronic device.

According to one aspect, there is provided a non-transitory storage medium that stores a control program that causes a mobile electronic device that is configured to determine transportation thereof to execute: detecting a predetermined vibration; detecting a predetermined change in magnetic field strength within a predetermined period of time while the predetermined vibration is being detected; determining that the transportation is a train when the predetermined change in the magnetic field strength is detected, and determining that the transportation is an automobile when the predetermined change in the magnetic field strength is not detected; and determining that, when predetermined information regarding rotation of the mobile electronic device is detected, the transportation is an automobile even when the predetermined change in the magnetic field strength has been detected.

DETAILED DESCRIPTION OF THE PREFERRED EMBODIMENTS

Hereinbelow, a smartphone will be described as an example of a mobile electronic device. However, the mobile electronic device is not limited to a smartphone. The mobile electronic device may be a device other than a smartphone as long as the device is an electronic device which is portable by a user and executes determination of transportation thereof. For example, the mobile electronic device may be a device such as a mobile phone, a tablet, a portable personal computer, a digital camera, a media player, an electronic book reader, a navigator, or a game console.

Figure 1:
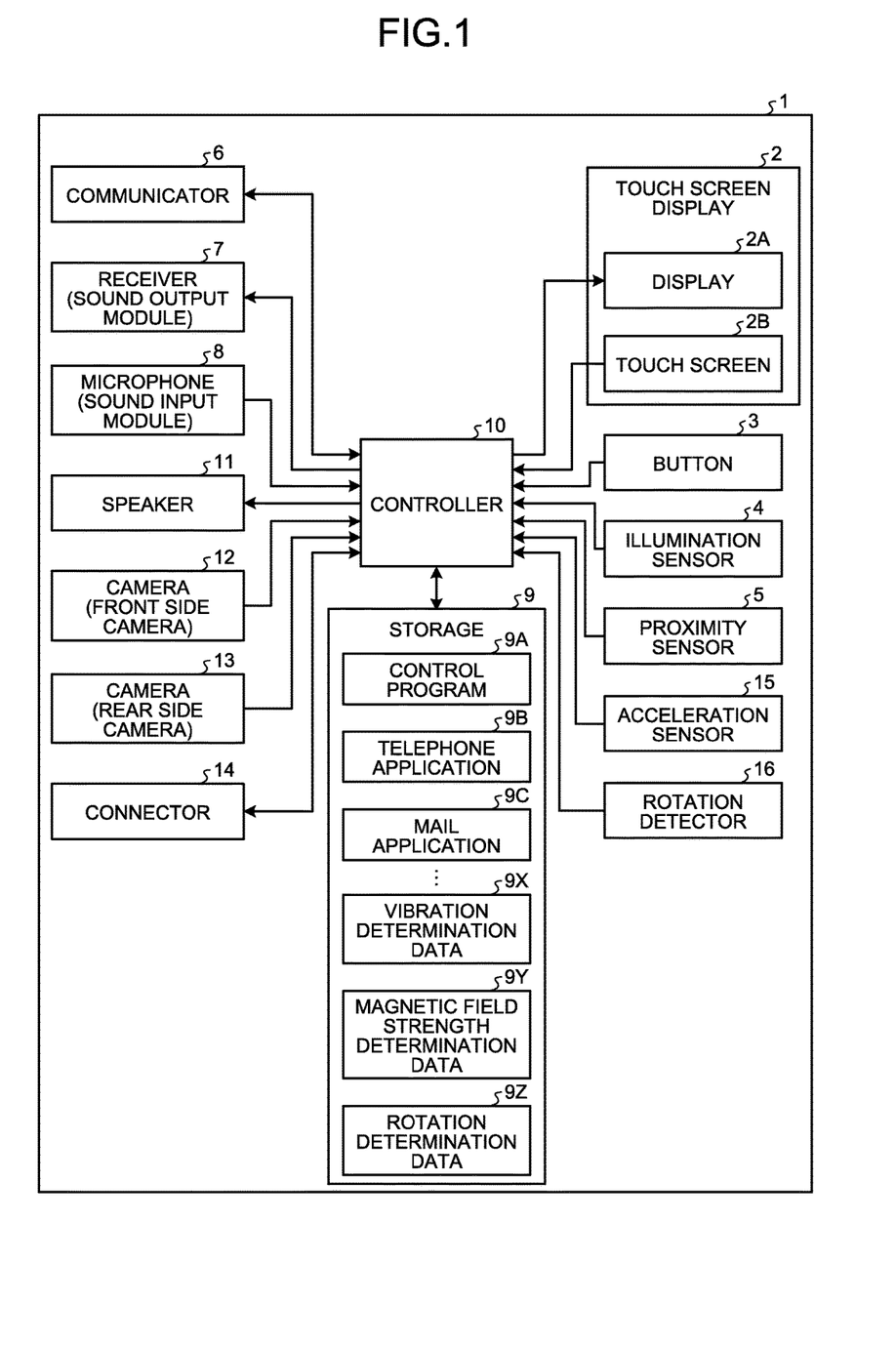
FIG. 1 is a block diagram illustrating an example of a functional configuration of a smartphone according to embodiments.

FIG. 1 is a block diagram illustrating an example of a functional configuration of a smartphone according to embodiments. In the following description, similar components may be denoted by the same reference signs. In addition, a repetitive description may be omitted.

As illustrated in FIG. 1, a smartphone 1 includes a touch screen display 2, a button 3, an illumination sensor 4, a proximity sensor 5, a communicator 6, a receiver 7, a microphone 8, a storage 9, a controller 10, a speaker 11, a camera 12, a camera 13, a connector 14, an acceleration sensor 15, and a rotation detector 16.

The touch screen display 2 includes a display 2A and a touch screen 2B. The display 2A and the touch screen 2B may be positioned to superimpose on each other, positioned side by side, or positioned separately, for example. When the display 2A and the touch screen 2B are positioned to superimpose on each other, for example, one or more sides of the display 2A are not necessarily positioned along any side of the touch screen 2B.

The display 2A includes a display device such as a liquid crystal display (LCD), an organic electro-luminescence display (OELD), or an inorganic electro-luminescence display (IELD). The display 2A may display a text, an image, a symbol, a graphic, and the like. A screen including a text, an image, a symbol, a graphic, and the like displayed by the display 2A includes a screen called a lock screen, a screen called a home screen, and an application screen displayed while an application is executed. The home screen may be called a desktop, a stand-by screen, an idle screen, a standard screen, an application list screen or a launcher screen.

The touch screen 2B detects contact by a finger, a pen, a stylus pen or the like with respect to the touch screen 2B. The touch screen 2B can detect positions at which a plurality of fingers, pens, stylus pens (hereinafter simply referred to as a "finger") or the like has contacted with the touch screen 2B. The touch screen 2B notifies the controller 10 of the contact of the finger with respect to the touch screen 2B

(touch screen display 2) together with the position of the contacted point on the touch screen display 2.

A detection type of the touch screen 2B may be any type selected from a capacitive type, a resistive film type, a surface acoustic wave type (or an ultrasonic type), an infrared type, an electromagnetic induction type, a load detection type, and the like. In the following description, it is assumed that a user touches the touch screen 2B using a finger to operate the smartphone 1 in order for simplification of the description.

The controller 10 (smartphone 1) determines a type of a gesture based on at least one of a contact detected by the touch screen 2B, a position where the contact is detected, a change in a position where the contact is detected, an interval between detected contacts, and the number of detection times of the contact. The gesture is an operation performed by a finger with respect to the touch screen 2B (touch screen display 2). Examples of the gesture determined by the controller 10 (smartphone 1) through the touch screen 2B include, but are not limited to, touch, long touch, release, swipe, tap, double tap, long tap, drag, flick, pinch-in, and pinch-out.

The button 3 receives an operation input from the user. The number of the button 3 may be one, or more than one.

The illumination sensor 4 detects illumination. Illumination is a value of light flux which is incident on a unit area on a measurement surface of the illumination sensor 4. The illumination sensor 4 is used, for example, for adjustment of the brightness of the display 2A.

The proximity sensor 5 detects the presence of a nearby object in a non-contact manner. The proximity sensor 5 detects the presence of an object based on a change in a magnetic field, a change in returning time of reflected ultrasonic waves, or the like. The proximity sensor 5 detects, for example, approaching of a face to the display 2A. The illumination sensor 4 and the proximity sensor 5 may be configured as one sensor. The illumination sensor 4 may be used as a proximity sensor.

The communicator 6 performs communication in a wireless manner. Examples of wireless communication standards supported by the communicator 6 include a communication standard for cellular phones such as 2G, 3G, and 4G, and a short range wireless communication standard. Examples of the communication standard for cellular phones include Long Term Evolution (LTE), Wideband Code Division Multiple Access (W-CDMA), Worldwide Interoperability for Microwave Access (WiMAX), CDMA 2000, Personal Digital Cellular (PDC), Global System for Mobile Communications (GSM) (registered trademark), and Personal Handyphone System (PHS). Examples of the short range wireless communication standard include IEEE802.11, Bluetooth (registered trademark), Infrared Data Association (IrDA), Near Field Communication (NFC), and Wireless Personal Area Network (WPAN). An example of the WPAN communication standard is ZigBee (registered trademark). The communicator 6 may support one or more of the communication standards described above.

The receiver 7 is a sound output module. The receiver 7 outputs a sound signal transmitted from the controller 10 as sound. The receiver 7 may be used, for example, for outputting a voice of a partner on calling. The microphone 8 is a sound input module. The microphone 8 converts voice of the user or the like into a sound signal and transmits the sound signal to the controller 10.

The storage 9 stores a program and data therein. The storage 9 may be used as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a storage medium such as a memory card, an optical disc, or a magneto-optical disk, and a reading device of the storage medium. The storage 9 may include a storage device that is used as a temporary storage area such as a random access memory (RAM).

The program stored in the storage 9 includes an application executed in the foreground or the background, and a control program which assists an operation of the application. A screen of the application executed in the foreground is displayed, for example, in the display 2A. The control program includes, for example, an OS. The application and the control program may be installed in the storage 9 through wireless communication by the communicator 6 or a non-transitory storage medium.

The storage 9 stores a control program 9A, a telephone application 9B, a mail application 9C, vibration determination data 9X, magnetic field strength determination data 9Y, rotation determination data 9Z, and the like.

The control program 9A provides functions related to various kinds of control of the smartphone 1. The control program 9A provides, for example, a function for determining transportation of the smartphone. The control program 9A provides a function for measuring a change in magnetic field strength for a certain time (predetermined monitoring time). For example, in a case where N geomagnetic data are measured by the rotation detector 16 per unit time T, the geomagnetic data by a number corresponding to a certain time H (N×H/T) is acquired from the rotation detector 16 to calculate a variance or standard deviation of geomagnetic values based on the acquired geomagnetic data. The control program 9A provides a function to determine that, for example, while a predetermined vibration is being detected, the transportation of the smartphone is a train when a predetermined change in the magnetic field strength is detected within a predetermined period of time, and that the transportation is an automobile when the predetermined change in the magnetic field strength is not detected within the predetermined period of time. A function for detecting a change in the magnetic field strength obtains, for example, the variance or standard deviation of the geomagnetic values calculated based on the geomagnetic data acquired from the rotation detector 16 as a magnitude of a change in the magnetic field strength, and determines whether the change in the magnetic field strength corresponds to a predetermined change. A value indicative of the magnitude of the change in the geomagnetic values is not limited to the variance or standard deviation. For example, the value indicative of the magnitude of the change in the geomagnetic values may be a difference between the maximum value and the minimum value of the geomagnetic values calculated based on the geomagnetic data acquired from the rotation detector 16. When predetermined information regarding the rotation of the smartphone 1 is detected for example, the control program 9A provides the function to determine that the transportation of the smartphone is an automobile even when the predetermined change in the magnetic field strength has been detected within the predetermined period of time. A function for detecting predetermined information regarding the rotation of the smartphone 1 detects, for example, the number of times orientation of the smartphone 1 has changed within a certain time (predetermined monitoring time), or a rotation angle (or angular velocity) of the smartphone 1 which changes within the certain time (predetermined monitoring time).

The telephone application 9B provides a call function for making a call through wireless communication. The mail application 9C provides a function for composition, transmission, reception, display, and the like, of e-mail.

The vibration determination data 9X is data for determining transportation of the smartphone based on a vibration detected by the acceleration sensor 15. The vibration determination data 9X corresponds to, for example, data regarding a vibration detected by the acceleration sensor 15 when the user is in an automobile, or data regarding a vibration detected by the acceleration sensor 15 after the user gets off the automobile. The magnetic field strength determination data 9Y is data for determining, based on magnetic field strength (geomagnetic values) detected by the rotation detector 16, a magnitude of a change in the magnetic field strength (geomagnetic values) acting on the smartphone 1. The magnetic field strength determination data 9Y is, for example, data regarding the magnetic field strength detected by the rotation detector 16 when the user is in a train. The rotation determination data 9Z is data for determining that the transportation of the smartphone is an automobile based on the predetermined information regarding the rotation detected by the rotation detector 16. The rotation determination data 9Z corresponds to, for example, a threshold for comparison with the number of change in the orientation within a certain time (predetermined monitoring time), or a threshold for comparison with a rotation angle (or angular velocity) of the smartphone 1 changed within the certain time (predetermined monitoring time). The number of change in the orientation of the smartphone 1 corresponds to, for example, the number of rotation by ±40 degrees to 360 degrees of the smartphone 1 within the certain time (predetermined monitoring time) based on the orientation of the smartphone 1 detected on counting the number of the rotation. The number of the rotation of the smartphone 1 may be counted as one when the rotation is stopped for a certain time after the start of the rotation, or when the smartphone 1 has rotated by 360 degrees. After the counting, the number of the rotation of the smartphone 1 may be detected and counted again within the predetermined monitoring time. The rotation angle (or angular velocity) of the smartphone 1 may be a rotation angle (or angular velocity) with respect to a reference direction predetermined for the smartphone 1. The reference direction may be a particular direction such as north or south, or may be a direction of the smartphone 1 at the start of the measurement of the rotation angle.

The controller 10 is a processor. Examples of the processor include, but are not limited to, a central processing unit (CPU), a system-on-a-chip (SoC), a micro control unit (MCU), a field-programmable gate array (FPGA), and a coprocessor. The controller 10 integrally controls operations of the smartphone 1 to realize various functions. The controller 10 is an example of a controller.

Specifically, the controller 10 executes commands included in a program stored in the storage 9 while referring to data stored in the storage 9 as needed. Subsequently, the controller 10 controls functional modules in accordance with the data and the commands, thereby realizing the various functions. Examples of the functional modules include, but are not limited to, the display 2A, the communicator 6, the microphone 8, and the speaker 11. The controller 10 may change control in accordance with a detection result of a detection module. Examples of the detection module include, but are not limited to, the touch screen 2B, the button 3, the illumination sensor 4, the proximity sensor 5, the microphone 8, the camera 12, the camera 13, the acceleration sensor 15, and the rotation detector 16.

The controller 10 executes, for example, a process for determining transportation of the smartphone by executing the control program 9A. The controller 10 measures a change in the magnetic field strength for a certain time (predetermined monitoring time) by executing the control program 9A. Specifically, in a case where N geomagnetic data are measured per unit time T by the rotation detector 16, the controller 10 acquires the geomagnetic data by a number corresponding to a certain time H (N×H/T) from the rotation detector 16 and calculates the variance or standard deviation of geomagnetic values based on the acquired geomagnetic data. By executing the control program 9A, the controller 10 determines that the transportation of the smartphone is a train, for example, when a predetermined change in the magnetic field strength is detected within a predetermined period of time while a predetermined vibration is being detected. On the other hand, the controller 10 executes a process for determining that the transportation of the smartphone is an automobile when the predetermined change in the magnetic field strength is not detected within the predetermined period of time. Specifically, the controller 10 obtains the variance or standard deviation of the geomagnetic values calculated based on the geomagnetic data acquired from the rotation detector 16 as a magnitude of a change in the magnetic field strength, and determines whether the change in the magnetic field strength corresponds to a predetermined change. By executing the control program 9A, when the predetermined information regarding the rotation of the smartphone 1 is detected, for example, the controller 10 executes a process for determining that the transportation of the smartphone is an automobile even when the predetermined change in the magnetic field strength has been detected within the predetermined period of time. Specifically, the controller 10 determines whether the predetermined information regarding the rotation of the smartphone 1 has been detected by determining whether the number of change in the orientation of the smartphone 1 within a certain time (predetermined monitoring time), or a rotation angle (or angular velocity) of the smartphone 1 changed within the certain time (predetermined monitoring time) satisfies a predetermined condition (rotation determination data 9Z).

The speaker 11 is a sound output module. The speaker 11 outputs a sound signal transmitted from the controller 10 as sound. The speaker 11 is used, for example, for outputting a ring tone and music. One of the receiver 7 and the speaker 11 may also have a function of the other.

The camera 12 and the camera 13 convert a captured image into an electric signal. The camera 12 is a front side camera which images an object facing the display 2A. The camera 13 is a rear side camera which images an object facing the opposite surface of the display 2A. The camera 12 and the camera 13 may be mounted on the smartphone 1 as a camera unit which can be used while performing switching between the front side camera and the rear side camera, in such a manner as to be functionally and physically integrated.

The connector 14 is a terminal to which other device is connected. The connector 14 may be a general-purpose terminal such as a universal serial bus (USB), a High-Definition Multimedia Interface (HDMI) (registered trademark), Light Peak (Thunderbolt (registered trademark)), and an earphone/microphone connector. The connector 14 may be a dedicated terminal such as a dock connector. Examples of the device connected to the connector 14 include, but are not limited to, an external storage, a speaker, and a communication device.

The acceleration sensor 15 detects a direction and a magnitude of acceleration acting on the smartphone 1. The rotation detector 16 detects information regarding the rotation of the smartphone 1. The rotation detector 16 may be configured to include, for example, a geomagnetic sensor. The rotation detector 16 detects, for example, magnetic field strength acting on the smartphone 1. The rotation detector 16 detects, for example, a direction (azimuth) of the smartphone 1. The rotation detector 16 may be configured to include, for example, a gyroscope. The rotation detector 16 including the gyroscope detects, for example, a rotation angle (or angular velocity) of the smartphone 1. In a smartphone 1 according to some embodiments, a function for detecting magnetic field strength, and a function for detecting a direction of the smartphone 1 may be integrated and mounted on the rotation detector 16, or each function may be physically distributed.

The smartphone 1 may include, in addition to each function module described above, a GPS receiver and a vibrator. The GPS receiver receives radio signals of a predetermined frequency band from GPS satellites, performs a decoding process of the received radio signals, and transmits the processed signals to the controller 10. The vibrator vibrates a part or the entire of the smartphone 1. In order to generate a vibration, the vibrator includes, for example, a piezoelectric element or an eccentric motor. Although it is not illustrated in FIG. 1, a function module such as a battery inevitably used for maintaining functions of the smartphone 1 is mounted on the smartphone 1.

Figure 2:
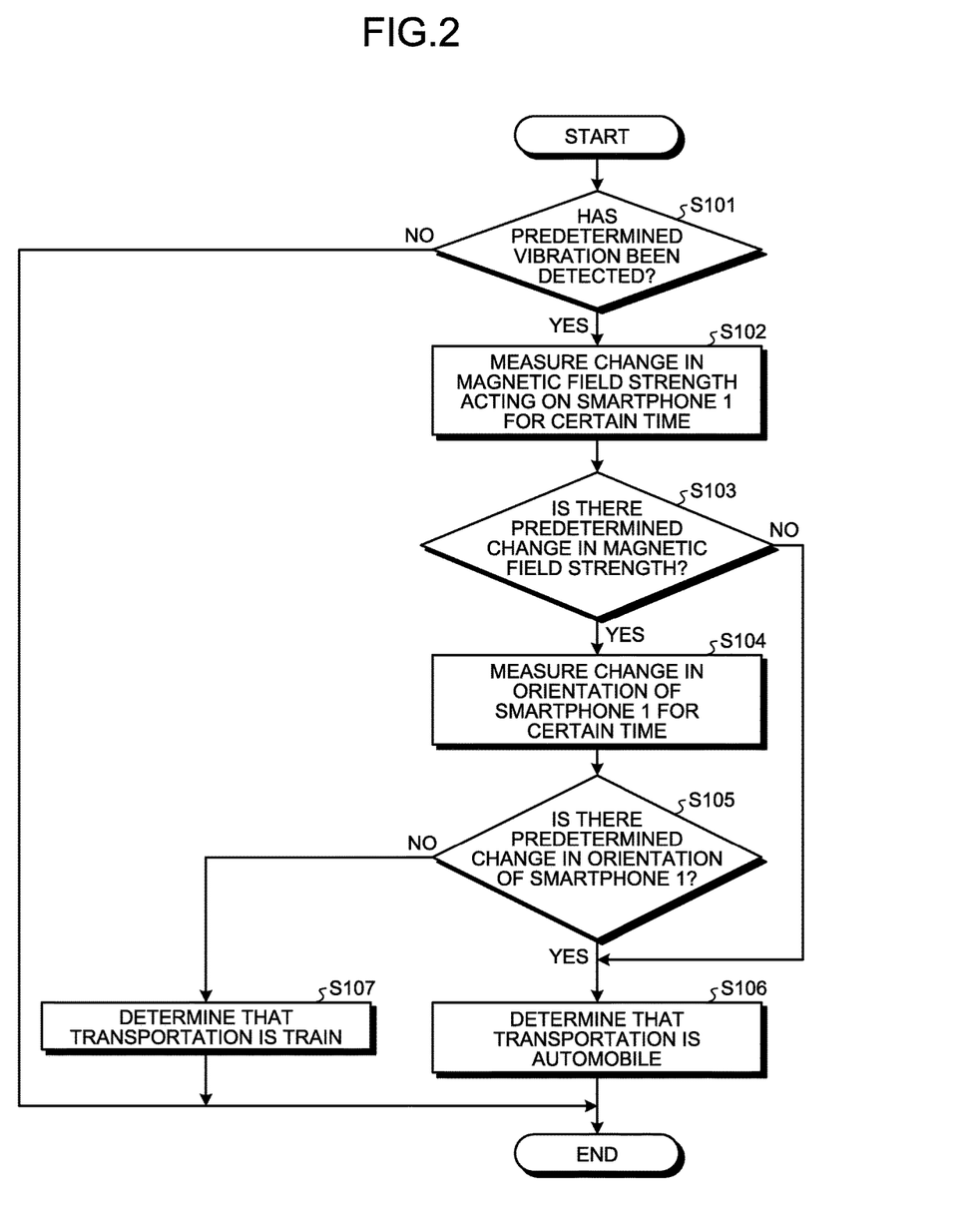
FIG. 2 is a flowchart illustrating an example of a flow of a process performed by the smartphone according to embodiments.

FIG. 2 is a flowchart illustrating an example of a flow of a process performed by the smartphone according to embodiments. The process illustrated in FIG. 2 is realized by the controller 10 executing the control program 9A stored in the storage 9, and the like.

As illustrated in FIG. 2, the controller 10 determines whether a predetermined vibration has been detected (Step S101). The controller 10 determines, based on the vibration determination data 9X, for example, whether a vibration detected by the acceleration sensor 15 is consistent with a vibration detected by the acceleration sensor 15 when the user is in an automobile.

When the predetermined vibration has been detected as a result of the determination (Yes at Step S101), the controller 10 measures a change in magnetic field strength acting on the smartphone 1 for a certain time (Step S102). Subsequently, the controller 10 determines whether there is a predetermined change in the magnetic field strength measured at Step S102 (Step S103). The controller 10 determines, based on the magnetic field strength determination data 9Y, for example, whether a magnitude of the change in the magnetic field strength detected by the rotation detector 16 is larger than a predetermined threshold.

When there is the predetermined change in the magnetic field strength as a result of the determination (Yes at Step S103), the controller 10 measures change in an orientation of the smartphone 1 for a certain time (Step S104). The controller 10 may determine that there is the predetermined change in the magnetic field strength, for example, when a magnitude of a detected change in the magnetic field strength exceeds the predetermined threshold. The orientation of the smartphone 1 includes a direction (azimuth) of the smartphone 1 detected by the geomagnetic sensor mounted on the rotation detector 16, or a rotation angle (angular velocity) of the smartphone 1 detected by the gyroscope mounted on the rotation detector 16.

Subsequently, the controller 10 determines whether there is a predetermined change in the orientation of the smartphone 1 based on the orientation of the smartphone 1 measured at Step S104 (Step S105). The controller 10 determines whether the number of change in the orientation of the smartphone 1 within a certain time detected by the rotation detector 16 exceeds a threshold, with reference to the rotation determination data 9Z, for example. Alternatively, the controller 10 determines whether the rotation angle (or angular velocity) of the smartphone 1 detected by the rotation detector 16 exceeds a threshold, with reference to the rotation determination data 9Z, for example.

When there is the predetermined change in the orientation of the smartphone 1 as a result of the determination (Yes at Step S105), the controller 10 determines that the transportation of the smartphone is an automobile (Step S106) and terminates the process illustrated in FIG. 2.

On the other hand, when there is no predetermined change in the orientation of the smartphone 1 as a result of the determination (No at Step S105), the controller 10 determines that the transportation of the smartphone is a train (Step S107) and terminates the process illustrated in FIG. 2.

In Step S103 above, when there is no predetermined change in the magnetic field strength as a result of the determination (No at Step S103), the controller 10 proceeds to the procedure of Step S106 above to determine that the transportation of the smartphone is an automobile and terminates the process illustrated in FIG. 2. The controller 10 may determine, for example, that there is no predetermined change in the magnetic field strength, when a magnitude of a detected change in the magnetic field strength is less than or equal to the predetermined threshold.

In Step S101 above, when the predetermined vibration is not detected as a result of the determination (No at Step S101), the controller 10 terminates the process illustrated in FIG. 2.

When the user in an automobile enters a magnetized building such as a parking structure, there may be a risk that the smartphone 1 detects a change in the magnetic field strength similar to that detected when the user is in a train. That is, there may be a risk that the transportation is erroneously determined to be a train even when the user is in an automobile. On the contrary, even when a unique change in the magnetic field strength, which is detected when the user is in a train, is detected, the smartphone 1 can determine that the transportation is an automobile when a change in the orientation of the smartphone 1, which is hardly detected when the user is in a train, is detected. That is, in a parking structure where an automobile is intended to travel spirally, for example, a unique change in a direction thereof is detected in the smartphone 1. The change in the direction is extremely less likely to be detected when the user is in a train.

The smartphone 1 may maintain a determination result that the transportation is an automobile for a period of time during which the predetermined vibration is continuously detected after it is determined that the transportation is an automobile.

The control program 9A may provide a function for maintaining the determination result that the transportation is an automobile, for example, for a period of time during which the predetermined vibration described later is being detected after it is determined that the transportation is an automobile. The predetermined vibration includes a vibration detected by the acceleration sensor 15 when the user is in an automobile and a vibration detected by the acceleration sensor 15 when the user is in a state other than a state after getting out of the automobile. The state after getting out of the automobile is a state where the user has got out of the automobile with the smartphone 1, for example, a state where the user is walking or running. The state other than the state after getting out of the automobile means a state where the user does not get out of the automobile after the automobile starts. The state where the user does not get out of the automobile after the automobile starts includes, for example, a state where the automobile is temporarily stopped and an engine thereof is idling. In other words, the control program 9A may maintain the determination result that the transportation is an automobile, when any vibration other than that in the state after getting out of the automobile continues after it is determined that the transportation is an automobile. The control program 9A may ignore the determination that any vibration other than that in the state after getting out of the automobile does not continue and maintain the determination result that the transportation is an automobile, in a case where the detected vibration becomes extremely small or the vibration is no longer detected from when the vibration indicating that the user is in an automobile is detected till when the vibration indicating that it is a state after getting out of the automobile is detected. With the above configuration, the smartphone 1 can maintain the determination result that the transportation is an automobile even when an automobile having an idling stop function temporarily stops, or when an automobile temporarily parks.

The controller 10 executes the control program 9A, thereby executing, for example, a process for maintaining the determination result that the transportation is an automobile for a period of time during which the predetermined vibration is being detected after it is determined that the transportation is an automobile.

Figure 3:
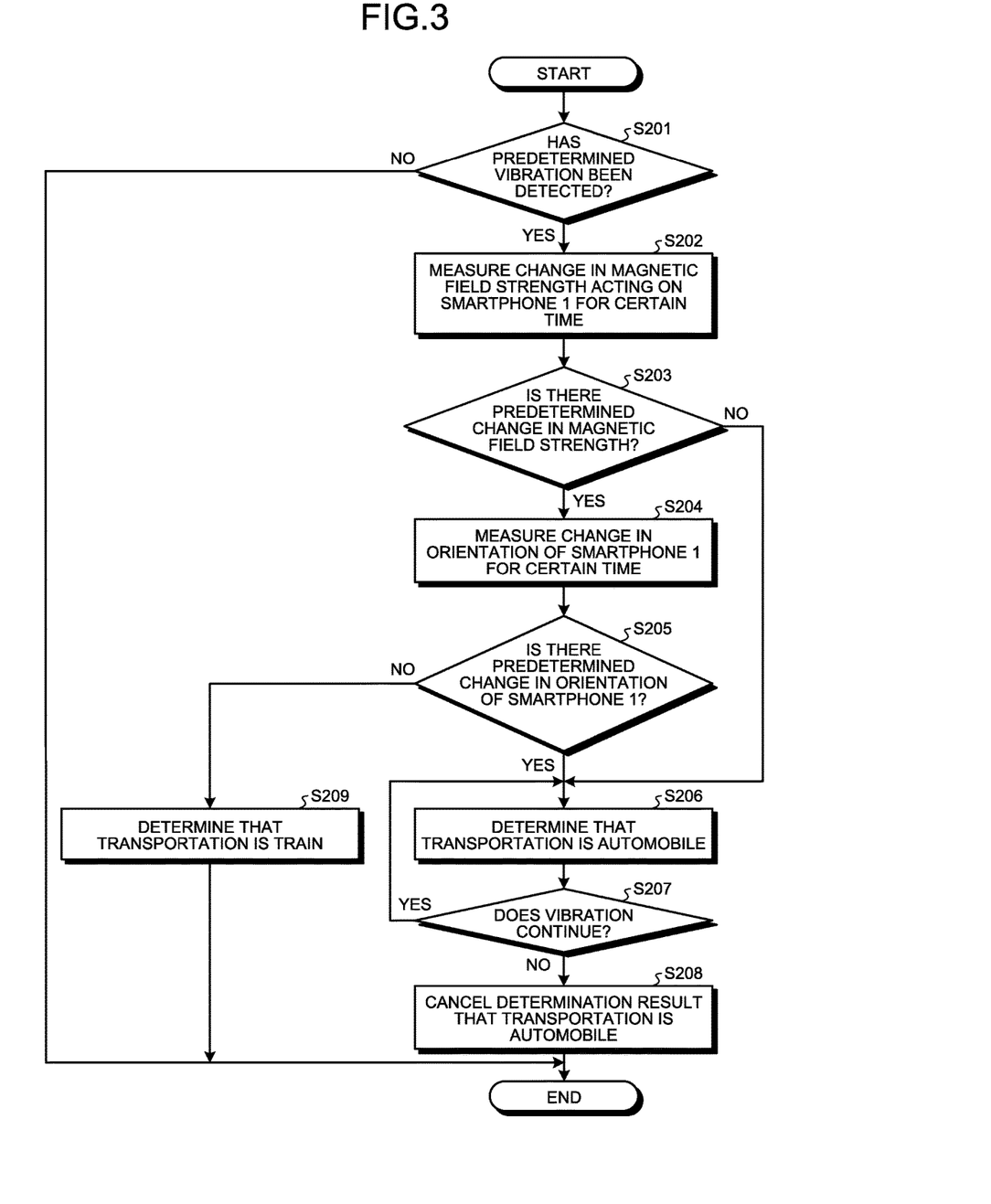
FIG. 3 is a flowchart illustrating an example of a flow of a process performed by the smartphone according to embodiments.

FIG. 3 is a flowchart illustrating an example of a flow of a process performed by the smartphone 1 according to embodiments. The process illustrated in FIG. 3 is realized by the controller 10 executing the control program 9A stored in the storage 9, and the like.

As illustrated in FIG. 3, the controller 10 determines whether a predetermined vibration has been detected (Step S201). The controller 10 determines based on the vibration determination data 9X, for example, whether a vibration detected by the acceleration sensor 15 is consistent with a vibration detected by the acceleration sensor 15 when the user is in an automobile.

When the predetermined vibration has been detected as a result of the determination (Yes at Step S201), the controller 10 measures a change in magnetic field strength acting on the smartphone 1 for a certain time (Step S202). Subsequently, the controller 10 determines whether there is a predetermined change in the magnetic field strength measured at Step S202 (Step S203). The controller 10 determines based on the magnetic field strength determination data 9Y, for example, whether a magnitude of the change in the magnetic field strength detected by the rotation detector 16 is larger than a predetermined threshold.

When there is the predetermined change in the magnetic field strength as a result of the determination (when the magnitude of the change in the magnetic field strength exceeds the predetermined threshold) (Yes at Step S203), the controller 10 measures a change in the orientation of the smartphone 1 for a certain time (Step S204). Subsequently, the controller 10 determines whether there is a predetermined change in the orientation of the smartphone 1 based on the change in the orientation of the smartphone 1 measured at Step S204 (Step S205). The controller 10 determines whether the number of times the orientation of the smartphone 1 has changed within a certain time detected by the rotation detector 16 exceeds a threshold, with reference to the rotation determination data 9Z, for example. Alternatively, the controller 10 determines whether the rotation angle (or angular velocity) of the smartphone 1 detected by the rotation detector 16 exceeds a threshold, with reference to the rotation determination data 9Z, for example.

When there is the predetermined change in the orientation of the smartphone 1 as a result of the determination (Yes at Step S205), the controller 10 determines that the transportation is an automobile (Step S206).

Subsequently, the controller 10 determines whether the vibration continues (Step S207). The vibration in Step S207 may be the vibration detected by the acceleration sensor 15 when the user is in an automobile, or the vibration detected by the acceleration sensor 15 when the user is in a state other than the state after getting out of the automobile. The processing procedure in Step S207 is intended to maintain the determination result that the transportation is an automobile, when any vibration other than that in the state after getting out of the automobile continues after it is determined that the transportation is an automobile.

When the vibration continues as a result of the determination (Yes at Step S207), the controller 10 returns to Step S206 above and maintains the determination result that the transportation is an automobile.

When the vibration does not continue as a result of the determination (No at Step S207), the controller 10 cancels the determination result that the transportation is an automobile (Step S208) and terminates the process illustrated in FIG. 3.

In Step S205 above, when there is no predetermined change in the orientation of the smartphone 1 as a result of the determination (No at Step S205), the controller 10 determines that the transportation is a train (Step S209) and terminates the process illustrated in FIG. 3.

In Step S203 above, when there is no predetermined change in the magnetic field strength as a result of the determination (No at Step S203), the controller 10 moves to the processing procedure in Step S206 above.

In Step S201 above, when the predetermined vibration is not detected as a result of the determination (No at Step S201), the controller 10 terminates the process illustrated in FIG. 3.

The smartphone 1 may maintain the determination result that the transportation is an automobile, when any vibration other than that in the state after getting out of the automobile continues after it is determined that the transportation is an automobile.

In a case where a gyro sensor is mounted as the rotation detector 16, timing for activation and deactivation thereof may be controlled as follows. For example, the gyro sensor may be activated when a vibration is detected by the acceleration sensor 15, and the gyro sensor may be deactivated when the transportation is definitely determined based on a detection result of the gyro sensor. Alternatively, the gyro sensor may be activated when the transportation cannot be definitely determined based on a detection result by the acceleration sensor 15, and the gyro sensor may be deactivated when the transportation is definitely determined. Consequently, power consumption by the gyro sensor can be reduced.

In a case where the geomagnetic sensor and the gyro sensor is mounted as the rotation detector 16, timing for activation and deactivation of the gyro sensor may be controlled as follows. When the transportation cannot be definitely determined based on a detection result by the acceleration sensor 15, the determination of the transportation is executed with a detection result by the geomagnetic sensor, and when the transportation cannot be definitely determined based on a detection result by the geomagnetic sensor, the gyro sensor is activated, and then deactivated when the transportation is definitely determined. Consequently, power consumption by the gyro sensor can be reduced.

The description has been given for one example of the smartphone 1 which determines whether the transportation is an automobile based on the detection result by the acceleration sensor 15. However, the determination method in the smartphone 1 is not limited thereto. For example, the smartphone 1 may determine whether the transportation is an automobile based on a detection result by the rotation detector 16 irrespective of the detection result by the acceleration sensor 15.

The appended claims should not be limited to the embodiments described above, but be construed as embodying all modifications and alternative configurations which may be made by a person skilled in the art within the basic teaching described herein.

The invention claimed is:

1. A mobile electronic device configured to determine transportation thereof, the mobile electronic device comprising:
   at least one controller that is configured to,
      while a predetermined vibration is being detected,
         determine that the transportation is an automobile based on predetermined information regarding rotation of the mobile electronic device, wherein
   the at least one controller is further configured to
      determine that the transportation is a train when a predetermined change in magnetic field strength is detected within a predetermined period of time, and
      determine that the transportation is an automobile when the predetermined change in the magnetic field strength is not detected within the predetermined period of time, and
   when the predetermined information regarding rotation of the mobile electronic device is detected,
      the at least one controller is further configured to determine that the transportation is an automobile even when the predetermined change in the magnetic field strength has been detected within the predetermined period of time.

2. The mobile electronic device according to claim 1, wherein the at least one controller is further configured to maintain a determination result that the transportation is an automobile while the predetermined vibration is being detected after it is determined that the transportation is an automobile.

3. The mobile electronic device according to claim 1, further comprising:
   an acceleration sensor configured to detect vibration; and
   a gyro sensor configured to detect rotation of the mobile electronic device, wherein
   the at least one controller is configured to
      determine that the transportation of the user is an automobile in response to a number of rotation of the mobile electronic device being more than a predetermined threshold number of rotation detected by the gyro sensor while a predetermined vibration is being detected by the acceleration sensor, and
   the predetermined threshold is a rotation of ±40 degrees of the mobile electronic device within a certain time.

4. The mobile electronic device according to claim 1, further comprising:
   an acceleration sensor configured to detect vibration; and
   a gyro sensor configured to detect rotation of the mobile electronic device, wherein
   the at least one controller is configured to
      determine that the transportation of the user is an automobile in response to a number of rotation of the mobile electronic device being more than a predetermined threshold number of rotation detected by the gyro sensor while a predetermined vibration is being detected by the acceleration sensor,
      activate the gyro sensor when the transportation of the user is not determined based on vibration detected by the acceleration sensor,
      deactivate the gyro sensor when the transportation of the user is determined based on the predetermined rotation detected by the gyro sensor.

5. A control method executed by a mobile electronic device that is configured to determine transportation thereof, the control method comprising:
   detecting a predetermined vibration;
   detecting a predetermined change in magnetic field strength within a predetermined period of time while the predetermined vibration is being detected;
   determining that the transportation is a train when the predetermined change in the magnetic field strength is detected, and determining that the transportation is an automobile when the predetermined change in the magnetic field strength is not detected; and
   determining that, when predetermined information regarding rotation of the mobile electronic device is detected, the transportation is an automobile even when the predetermined change in the magnetic field strength has been detected.

6. A non-transitory storage medium that stores a control program that causes a mobile electronic device that is configured to determine transportation thereof to execute:
   detecting a predetermined vibration;
   detecting a predetermined change in magnetic field strength within a predetermined period of time while the predetermined vibration is being detected;
   determining that the transportation is a train when the predetermined change in the magnetic field strength is detected, and determining that the transportation is an automobile when the predetermined change in the magnetic field strength is not detected; and
   determining that, when predetermined information regarding rotation of the mobile electronic device is detected, the transportation is an automobile even when the predetermined change in the magnetic field strength has been detected.

* * * * *